United States Patent [19]

Lawson

[11] Patent Number: 5,007,879
[45] Date of Patent: Apr. 16, 1991

[54] DOG CHEW PROCESSING METHOD

[76] Inventor: Richard L. Lawson, 3272 N. Greenwood, Sanger, Calif. 93657

[21] Appl. No.: 596,276

[22] Filed: Oct. 12, 1990

Related U.S. Application Data

[63] Continuation of Ser. No. 443,457, Nov. 29, 1989, Pat. No. 4,985,964.

[51] Int. Cl.$^5$ ............................................. A22C 17/00
[52] U.S. Cl. ........................................ 452/198; 426/5
[58] Field of Search ...................... 452/198, 166, 172; 426/3, 5, 274

[56] References Cited

U.S. PATENT DOCUMENTS

| | | | |
|---|---|---|---|
| 3,507,387 | 4/1970 | Alldred, Jr. et al. | 209/2 |
| 3,882,257 | 5/1975 | Cagle | 426/274 |
| 4,260,635 | 4/1981 | Fisher | 426/3 |
| 4,299,009 | 11/1981 | Tournier | 17/1 G |
| 4,880,642 | 11/1989 | Berends | 426/5 |

Primary Examiner—Willis Little
Attorney, Agent, or Firm—Townsend and Townsend

[57] ABSTRACT

A method for processing cattle hooves (38), for use as a dog chew includes the steps of cleaning (42) the hoof, removing (44) a thin portion of the bottom (24) of the hoof to minimize removal of the hoof pad (26). This is accomplished by positioning a bandsaw blade (48) adjacent a backing plate (54). The bottom of the hoof is placed against the backing plate and the hoof is moved into the bandsaw blade. This results in a relatively thin layer of the bottom of the hoof being removed, generally equal to the thickness of the bandsaw blade itself. The top (6) of the hoof is removed (62) as well and then the hoof is passed through a number of steps for finished processing, including the following steps: pre-wash (64), first boiling (66), first rinsing (68), second boiling (70), second rinsing (72) and drying (74). A finished tumbling step (74) is used to smooth over sharp edges and to remove any thin, brittle edges (30) of the hooves for safety.

9 Claims, 2 Drawing Sheets

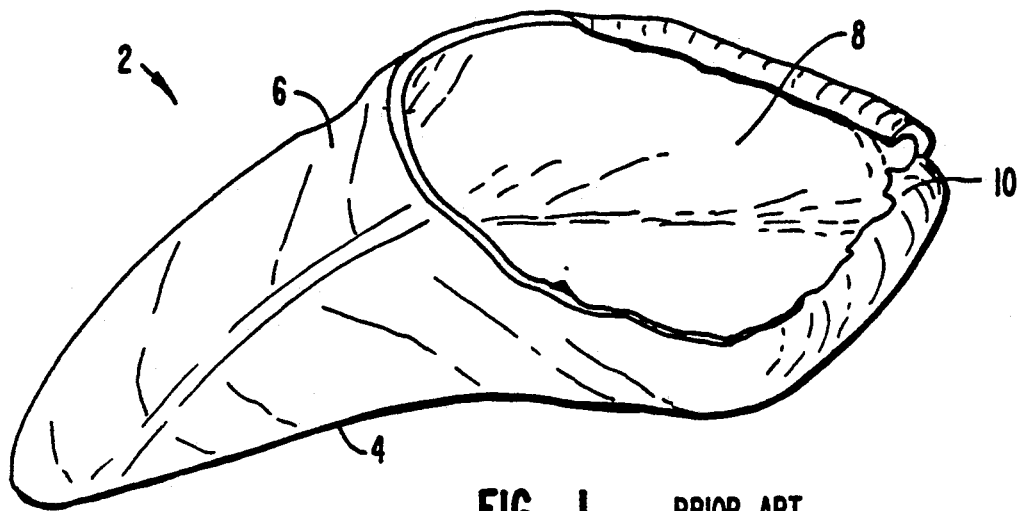
FIG.\_1.    PRIOR ART
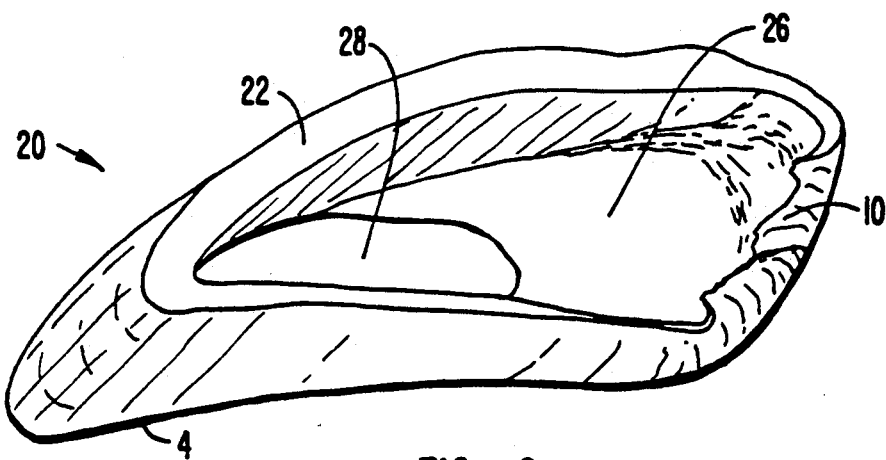
FIG.\_2.    PRIOR ART
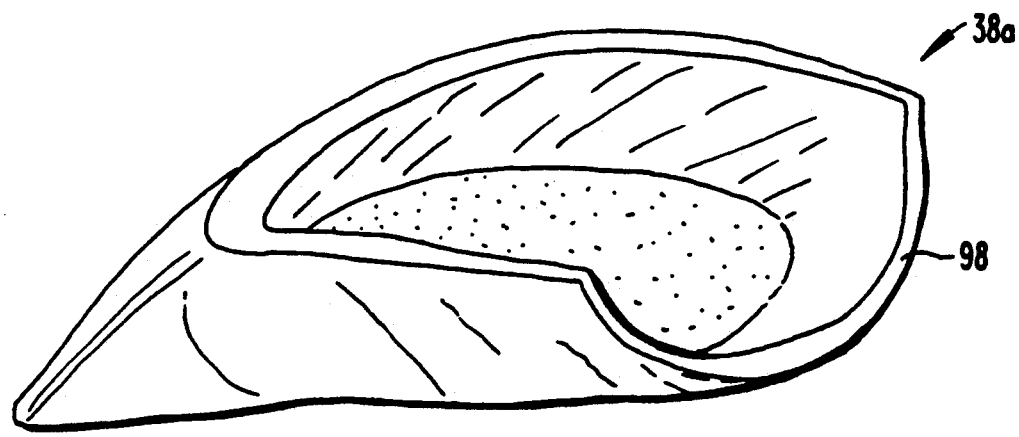
FIG.\_6.

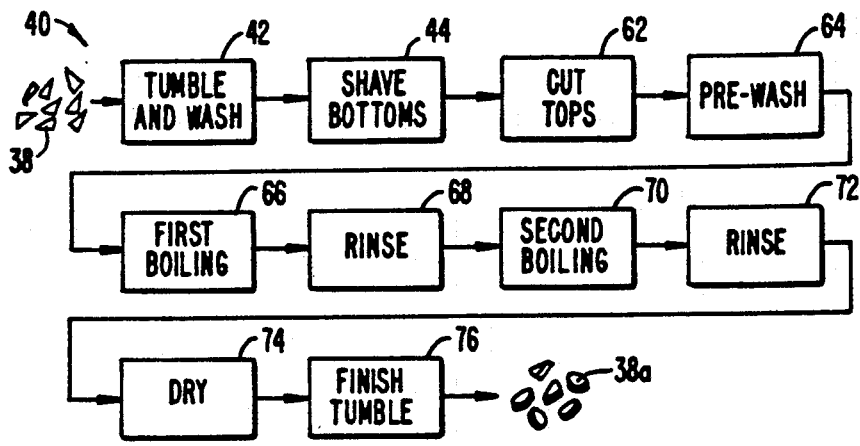
FIG._3.
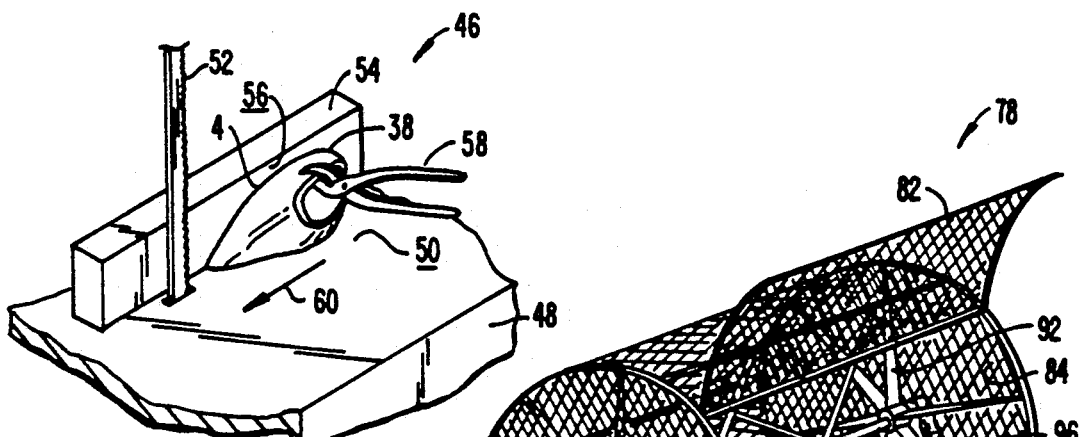
FIG._4.
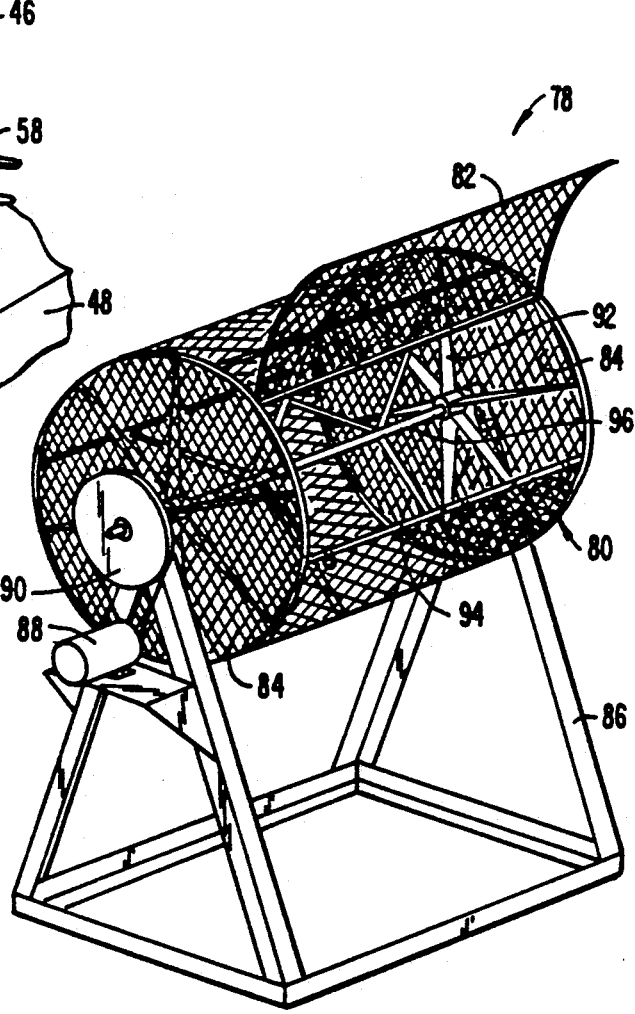
FIG._5.

DOG CHEW PROCESSING METHOD

This is a continuation of application Ser. No. 07/443,457 filed Nov. 29, 1989 now Pat. No. 4,985,964.

BACKGROUND OF THE INVENTION

Dogs seem to have an insatiable appetite for chewing on things. However, some things, such as sticks and brittle bones, are often not good for dogs. Dogs, being dogs, do not seem to understand this. To provide dogs with acceptable substitutes, many different products, such as rawhide chews, have been developed. Although rawhide chews do not have the drawbacks of sticks and brittle bones, they may not be healthful for the dog. For example, some rawhide chews are processed using chemicals which may be harmful to the dog.

Beef processing plants operate under very tight margins. To make a profit, all parts of the animal must be used. Cattle hooves, being a hardened form of a gelatinous material, are often rendered to a gelatinous consistency for further use. However, it has been found that cattle hooves are highly esteemed by dogs for chewing. Since the hooves are over half protein, if processed correctly cattle hooves can be a safe and nutritious dog chew.

Cleaned and sterilized cattle hooves, shown in FIG. 1, were originally marketed in the United Kingdom. It, however, looks just like what it is, a cattle hoof, and thus met with some consumer resistance. Also, the upper edges of the hoof were usually somewhat thin and had a tendency to break off. The thin upper edges could also become wedged between the dog's teeth. To make the product more marketable, from both aesthetic and safety standpoints, a small slice, approximately ⅜" thick, was removed from the bottom of the hoof. A parallel cut was also made to remove the top of the hoof. The result was a dog chew product, about 8/10" thick, shown in FIG. 2. This product did not look so much like a cattle hoof and removed much of the thin upper edge and thus at least partially overcame the deficiencies of the whole hoof dog chew product.

SUMMARY OF THE INVENTION

The present invention is directed to a method for processing hooves for use as a dog chew which is aesthetical acceptable to the customer, safe for the dog and retains most of the desirable pad of the hoof.

The method includes the steps of first cleaning the hoof and then removing a controlled thickness, thin layer of the bottom of the hoof to minimize removal of the hoof pad. This is preferably accomplished by positioning a bandsaw blade adjacent, that is substantially touching, a backing plate. The bottom of the hoof is placed against the backing plate. The hoof is moved into the bandsaw blade while resting against the backing plate. This procedure results in only a relatively thin layer of the bottom of the hoof being removed, generally about equal to the thickness of the bandsaw blade itself. The top of the hoof is preferably removed as well and then the hoof is passed through a number of steps for finished processing.

The finished processing includes boiling, rinsing and drying steps. A finished tumbling step is used to smooth over sharp edges. The finished tumbling step is carried out in a manner so that any thin, brittle top edges of the hooves are broken off for safety.

Other features and advantages of the invention will appear from the following description in which the preferred embodiment has been described in detail in conjunction with accompanying drawings.

BRIEF DESCRIPTION OF THE DRAWINGS

FIG. 1 is a perspective of a prior art cattle hoof processed for use as a pet chew.

FIG. 2 is a perspective view of a prior art hoof processed for use as a pet chew but with cuts made on the bottom and top of the hoof.

FIG. 3 is a schematic diagram of the processing steps according to the present invention.

FIG. 4 is a simplified view of the bandsaw equipment used in the bottom shaving step of FIG. 3.

FIG. 5 is a simplified view of a finish tumbler as used with the process of FIG. 3.

FIG. 6 is a perspective view of a hoof processed according to the present invention for use as a pet chew.

DETAILED DESCRIPTION OF THE PREFERRED EMBODIMENT

At FIG. 1 a conventional cattle hoof 2 is shown and is seen to include a bottom 4 and a top 6, the top defining an opening 8. Hoof 2 has been processed for use as a dog chew through a number of cleanings, washings and drying steps. However, hoof 2 looks just like what it is, an animal hoof, and thus has encountered some consumer resistance. Also, portions 10 of hoof 2 surrounding opening 8 are thin, relatively brittle sections which can on occasion injure a dog chewing on the hoof.

FIG. 2 shows a second conventional cattle hoof 20 processed to be used as a dog chew. Hoof 20 has had its top portion 6 removed through a cut along a top edge 22. A small slice, approximately ⅜" thick, has been removed from bottom 24 of hoof 20. The resulting hoof 20 is aesthetically more pleasing but still suffers from several drawbacks. First, by removing a portion of the bottom 24, only part of the pad 26 of hoof 20 remains. At least about half of pad 26 of hoof 20 has been removed as indicated by opening 28 in bottom 24. Loss of pad 26 is especially undesirable because dogs generally prefer pad 26 to the remainder of hoof 20. Also, thin, brittle portions 30 are not completely removed by the cut made along top edge 22.

The present invention will be first described in the broad sense of the processing steps taken to process hooves 38 and with reference to FIGS. 3 and 4. Process 40 includes a preliminary tumble and wash step 42 by which debris, that is rocks, dirt and other such undesirable material, is removed. After step 42, a bottom shaving processing step 44, at which the bottoms 4 are shaved, is accomplished. At this point the hooves 38 look very similar to hooves 2.

Referring now also to FIG. 4, the equipment 46 needed to shave bottoms 4 of hooves 38 is shown. Equipment 46 includes a bandsaw 48 having a working surface 50 and a bandsaw blade 52. A backing plate 54 is positioned on working surface 50 so that blade 52 lies adjacent, typically just touching, the outer surface 56 of backing plate 54. A worker grasps a hoof 38, typically with a pair of pliers 58, and rests the bottom 4 of hoof 38 against surface 56 of plate 54. Hoof 38 is then moved in the direction of arrow 60 so that a thin slice of bottom 4 is cut or shaved off by bandsaw blade 52. Since blade 52 is essentially touching surface 56, the thickness of the portion of bottom 4 removed by the blade is approximately equal to the thickness of the blade. Since the bandsaw blade is typically 0.025" or 0.028" thick, the amount of material shaved from bottom 4 is generally just slightly more than such thickness. Doing so substantially prevents the creation of openings 28 in the pad 26 of the hoof. Although step 44 is carried out manually, it could also be done on an automated or semiautomated basis. One advantage of manual feeding is that the operator can inspect bottom 4 of hoof 38 for rocks and bits of metal. Such inspections could also be done automatically using appropriate sensors as well.

After bottom shaving step 44, tops 6 of hooves 38 are then cut off at a top cutting step 62 to create a top edge 22 as shown in FIG. 2. This is done in a conventional manner, such as by moving plate 54 back away from bandsaw blade 52 about ¾" and passing hoof 38 between the two. After top cutting step 62, hooves 38 are then sent to a prewash step 64 in which the hooves are prewashed in water at 180° F. three times for 15 minutes duration each. Hooves 38 are then passed through a boiling step 66 at which the hooves are boiled in water 15 minutes at 212° F.

Next, hooves 38 are rinsed in cold water for 10 minutes at rinse step 68. After rinse step 68 hooves 38 are boiled in a solution of 100 parts water to 1 part peroxide. The hooves are boiled for 10 minutes at 212° F. at this second boiling step 70. Thereafter hooves 38 are rinsed for 15 minutes in water at 180° F. at a second rinse step 72. Hooves 38 are then dried in a hot chamber at 180° F. for 96 hours at a dry step 74. Finally, hooves 38 are finish tumbled at a finish tumble step 76 to create the resulting hoof 38a shown in FIG. 6.

Finish tumble step 76 is accomplished using tumbler 78 shown in FIG. 5. Tumbler 78 includes a cylindrical drum 80 made of a rigid framework 77 covered at its periphery 83 and ends 84 by a diamond plate screen 79, having a mesh size of about ½". Such screens help to remove sharp edges and protrusions from hooves 38. A hinged access door 82 constitutes part of periphery 83. Drum 80 is supported by a frame 86 and is rotated through a motor 88 at about 1 rpm through a cable and pulley arrangement 90.

Tumbler 78 includes two types of radially extending agitators 92, 94 within drum 80. End agitators 92 extend radially from a center shaft 96 adjacent each end 84. Two sets of intermediate agitators 94 extend from center shaft 96 at intermediate positions along tumbler 78. The addition of agitators 92, 94 has provided the appropriate tumbling action for hooves 38. Tumbling hooves 38 for approximately five and one-half hours at 1 rpm at finish tumble step 76 causes thin, brittle portions 30 (see FIG. 2) to be broken away or removed as shown by edge 98 of hoof 38a. The prior art hooves 20 of FIG. 2 had been tumbled in a tumbler substantially similar to tumbler 78 but without agitators 92, 94, such agitation failing to remove thin, brittle portions 30.

A primary aspect of the invention is the recognition that the bottom of a hoof could be cleaned up for aesthetic purposes by cutting away a portion of the bottom of a hoof equal to about the thickness of the saw blade. Another aspect of the invention is the recognition that with the proper tumbling action, the thin, brittle portions 30 existing with prior art hooves 20 could be removed without excessive loss of hoof material.

Modifications and variations can be made to the preferred embodiment without departing from the subject of the invention as defined in the following claims. For example, a different type of cutting element, such as a circular saw blade, could be used instead of bandsaw blade 52. Also, outer surface 56 of backing plate 54 could be recessed in the area adjacent bandsaw blade 52 to permit thicker bandsaw blades to be used while minimizing the thickness of the slice of the bottom of the hoof removed.

What is claimed is:

1. A method for processing a hoof for use as a pet chew, the hoof having a bottom and an upper edge, comprising the following steps:
   cleaning the hoof;
   removing a portion of the bottom of the hoof, the portion having a thickness; and
   limiting the thickness of said portion so as not to create a hole in the bottom of the hoof.

2. The method of claim 1 further comprising the step of removing the upper edge of the hoof.

3. The method of claim 1 further comprising the steps of boiling the hoof, rinsing the hoof and drying the hoof.

4. The method of claim 1 further comprising the step of finishing tumbling the hoof with other hooves.

5. The method of claim 4 wherein the finish tumbling step is carried out using a tumbler having an internal agitator.

6. The method of claim 5 wherein the finish tumbling step is carried out using internal agitators which extend radially from an axis of rotation of the tumbler.

7. The method of claim 6 wherein the finish tumbling step is carried out using a tumbler having ends and a length between the ends, and using radially extending internal agitators positioned adjacent the ends and positioned along the length between the ends.

8. The method of claim 1 further comprising the step of finish tumbling the hoof with other hooves in a manner to smooth any sharp edges and to remove any thin, brittle edges from the hooves.

9. The method of claim 1 further comprising the step of removing any thin, brittle edges on the hooves.

* * * * *

REEXAMINATION CERTIFICATE (1855th)
United States Patent
Lawson

[11] B1 5,007,879
[45] Certificate Issued Nov. 24, 1992

[54] DOG CHEW PROCESSING METHOD

[76] Inventor: Richard L. Lawson, 3272 N. Greenwood, Sanger, Calif. 93657

Reexamination Request:
No. 90/002,357, Jun. 3, 1991

Reexamination Certificate for:
Patent No.: 5,007,879
Issued: Apr. 16, 1991
Appl. No.: 596,276
Filed: Oct. 12, 1990

Related U.S. Application Data

[63] Continuation of Ser. No. 443,457, Nov. 29, 1989, Pat. No. 4,985,964.
[51] Int. Cl.$^5$ ............................................. A22C 17/00
[52] U.S. Cl. .......................................... 452/198; 425/5
[58] Field of Search ..................... 452/198, 166, 172; 426/3, 5, 274

[56] References Cited

U.S. PATENT DOCUMENTS

| | | | |
|---|---|---|---|
| 3,507,387 | 4/1970 | Alldred, Jr. et al. | 209/2 |
| 3,882,257 | 5/1975 | Cagle | 426/274 |
| 4,260,635 | 4/1981 | Fisher | 426/3 |
| 4,299,009 | 11/1981 | Tournier | 17/1 G |
| 4,880,642 | 11/1989 | Berends | 426/5 |

OTHER PUBLICATIONS

Pets Carousel ad for Dog Chewies, Gazette, p. 76, Sep. 1987.

*Primary Examiner*—Willis Little

[57] ABSTRACT

A method for processing cattle hooves (38), for use as a dog chew includes the steps of cleaning (42) the hoof, removing (44) a thin portion of the bottom (24) of the hoof to minimize removal of the hoof pad (26). This is accomplished by positioning a bandsaw blade (48) adjacent a backing plate (54). The bottom of the hoof is placed against the backing plate and the hoof is moved into the bandsaw blade. This results in a relatively thin layer of the bottom of the hoof being removed, generally equal to the thickness of the bandsaw blade itself. The top (6) of the hoof is removed (62) as well and then the hoof is passed through a number of steps for finished processing, including the following steps: pre-wash (64), first boiling (66), first rinsing (68), second boiling (70), second rinsing (72) and drying (74). A finished tumbling step (74) is used to smooth over sharp edges and to remove any thin, brittle edges (30) of the hooves for safety.

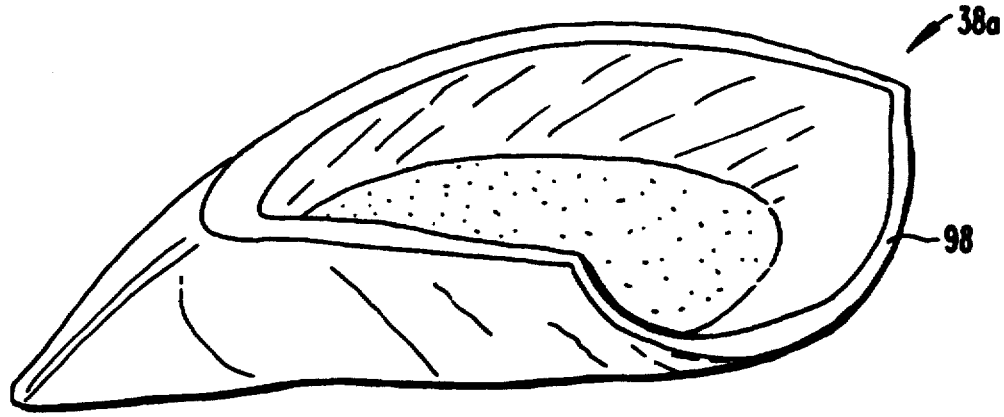

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, is determined to be patentable.

New claims 10-26 are added and determined to be patentable.

1. A method for processing a hoof for use as a pet chew, the hoof having a bottom and an upper edge, comprising the following steps:
   cleaning the hoof;
   removing a portion of the bottom of the hoof, the portion having a thickness; [and]
   limiting the thickness of said portion so as not to create a hole in the bottom of the hoof; *and*
   *drying the hoof in a controlled environment.*

*10. The method of claim 1 wherein the controlled environment includes a substantially constant temperature.*

*11. The method of claim 10 wherein the drying step is carried out in a hot chamber maintained at a substantially constant temperature of greater than 120° F.*

*12. The method of claim 10 further comprising the step of removing the upper edge of the hoof.*

*13. The method of claim 12 wherein the finish tumbling step is carried out using internal agitators which extend radially from an axis of rotation of the tumbler.*

*14. The method of claim 10 further comprising the steps of boiling the hoof and rinsing the hoof.*

*15. The method of claim 10 further comprising the step of finishing tumbling the hoof with other hooves.*

*16. The method of claim 15 wherein the finish tumbling step is carried out using a tumbler having an internal agitator.*

*17. The method of claim 15 wherein the finish tumbling step is carried out using a tumbler having ends and a length between the ends, and using radially extending internal agitators positioned adjacent the ends and positioned along the length between the ends.*

*18. A method for processing a hoof for use as a pet chew, the hoof having a bottom and an upper edge, comprising the following steps:*
   *cleaning the hoof;*
   *removing a portion of the bottom of the hoof, the portion having a thickness;*
   *limiting the thickness of said portion so as not to create a hole in the bottom of the hoof, wherein the limiting step includes the steps of: positioning a saw blade adjacent a backing plate; and moving at least one of the saw blade and the hoof towards the other to remove a portion of the bottom of the hoof by the saw blade, the portion having a thickness which is no greater than about the thickness of the saw blade.*

*19. The method of claim 18 wherein the saw blade positioning step is carried out using a band saw blade with a thickness of about 0.025".*

*20. A method for processing a hoof for use as a pet chew, the hoof having a bottom and an upper edge, comprising the following steps:*
   *cleaning the hoof;*
   *removing a portion of the bottom of the hoof, the portion having a thickness;*
   *limiting the thickness of said portion so as not to create a hole in the bottom of the hoof; and*
   *drying the hoof in a controlled environment, wherein the drying step is carried out in a hot chamber maintained at a substantially constant temperature of 180° F. for a period not less than 96 hours.*

*21. A method for processing a hoof for use as a pet chew, the hoof having a bottom and an upper edge, comprising the following steps:*
   *cleaning the hoof;*
   *removing a portion of the bottom of the hoof, the portion having a thickness;*
   *limiting the thickness of said portion so as not to create a hole in the bottom of the hoof; and*
   *drying the hoof in a controlled environment maintained at a substantially constant temperature for a period of time greater than 24 hours.*

*22. A method for processing a hoof for use as a pet chew, the hoof having a bottom and an upper edge, comprising the following steps:*
   *cleaning the hoof;*
   *removing a portion of the bottom of the hoof, the portion having a thickness;*
   *limiting the thickness of said portion so as not to create a hole in the bottom of the hoof wherein the limiting step includes the steps of:*
   *positioning a saw blade adjacent a backing plate; and*
   *moving at least one of the saw blade and the hoof towards the other to remove a portion of the bottom of the hoof by the saw blade, the portion having a thickness which is no greater than about the thickness of the saw blade; and*
   *drying the hoof in a controlled environment having a substantially constant temperature.*

*23. The method of claim 22 wherein the saw blade positioning step is carried out using a band saw blade with a thickness of about 0.025".*

*24. A method for processing a hoof for use as a pet chew, the hoof having a bottom and an upper edge, comprising the following steps:*
   *cleaning the hoof;*
   *removing a portion of the bottom of the hoof, the portion having a thickness;*
   *limiting the thickness of said portion so as not to create a hole in the bottom of the hoof; and*
   *drying the hoof in a hot chamber, the hot chamber having a controlled environment maintained at substantially constant temperature of 180° F. for a period not less than 96 hours.*

*25. The method of claim 24 wherein the limiting step includes the steps of:*
   *positioning a saw blade adjacent a backing plate; and*
   *moving at least one of the saw blade and the hoof towards the other to remove a portion of the bottom of the hoof by the saw blade, the portion having a thickness which is no greater than about the thickness of the saw blade.*

*26. The method of claim 25 wherein the saw blade positioning step is carried out using a band saw blade with a thickness of about 0.025".*

* * * * *